(12) United States Patent
Singh et al.

(10) Patent No.: US 7,289,491 B2
(45) Date of Patent: *Oct. 30, 2007

(54) INTERNET TELEPHONY ARRANGEMENT AND METHOD

(75) Inventors: Hardish Singh, Santa Clara, CA (US); Kevin E. Deierling, Los Altos Hills, CA (US); Bryan R. Martin, Campbell, CA (US)

(73) Assignee: 8x8, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/490,513

(22) Filed: Jul. 20, 2006

(65) Prior Publication Data

US 2007/0025343 A1    Feb. 1, 2007

Related U.S. Application Data (63) Continuation of application No. 08/741,265, filed on Oct. 30, 1996, now Pat. No. 7,092,379.

(51) Int. Cl.
*H04L 12/66* (2006.01)
*H04L 12/28* (2006.01)

(52) U.S. Cl. ............ 370/352; 370/389; 370/392; 370/410; 379/93.26

(58) Field of Classification Search ........ 370/352–360, 370/389, 400–410, 466, 392; 379/93.05, 379/93.26, 219, 93.01, 93.06
See application file for complete search history.

(56) References Cited

U.S. PATENT DOCUMENTS

| | | | |
|---|---|---|---|
| 5,008,927 A | 4/1991 | Weiss et al. | |
| 5,195,130 A | 3/1993 | Weiss et al. | |
| 5,351,237 A | 9/1994 | Shinohara et al. | |
| 5,369,700 A | 11/1994 | Koura et al. | |
| 5,592,538 A | 1/1997 | Kosowsky et al. | |
| 5,610,910 A | 3/1997 | Focsaneanu et al. | |
| 5,654,957 A | 8/1997 | Koyama et al. | |
| 5,726,984 A | 3/1998 | Kubler et al. | |
| 5,761,280 A | 6/1998 | Noonen et al. | |
| 5,799,063 A | 8/1998 | Krane | |

(Continued)

OTHER PUBLICATIONS

Schultzrinne et al. "RTP: A Transport Protocol for Real-Time Applications." RFC v. 1889. Jan. 1996.

(Continued)

*Primary Examiner*—Afsar Qureshi
(74) *Attorney, Agent, or Firm*—Crawford Maunu PLLC (57) ABSTRACT

An arrangement which includes a telephone and an interface unit, which interfaces the telephone to both a standard switched telephone communications network and an Internet communications network, is disclosed. The interface unit includes an input coupled to the telephone to receive audio information and two output ports configured to be respectively coupled to the standard switched telephone communications network and the Internet communications network. A processing unit couples the audio information received from the telephone to the first output port when the telephonic communication is to be performed using the standard switched telephone communications network. Alternatively, the processing unit processes the audio information received from the telephone in accordance with standard Internet transfer protocols and couples the processed audio information to the second output port when the telephonic communication is to be performed using the Internet communications network and the standard protocols.

20 Claims, 5 Drawing Sheets

U.S. PATENT DOCUMENTS

| | | |
|---|---|---|
| 5,809,118 A | 9/1998 | Carmello et al. |
| 5,838,665 A | 11/1998 | Kahn et al. |
| 5,848,143 A | 12/1998 | Andrews et al. |
| 5,862,202 A | 1/1999 | Bashoura et al. |
| 5,909,431 A | 6/1999 | Kuthyar et al. |
| 5,961,599 A | 10/1999 | Kalavade et al. |
| 5,963,547 A | 10/1999 | O'Neil et al. |
| 6,069,890 A | 5/2000 | White et al. |
| 6,438,218 B1 | 8/2002 | Farris et al. |
| 7,092,379 B1 * | 8/2006 | Singh et al. ............ 370/352 |

OTHER PUBLICATIONS

Carl Weinschenk and Andreas Evagor. "Mastering Voice: The Internet's Talk Show," pp. 1-6, tele.com, The McGraw-Hill Companies, Inc. Jun. 3, 1996.

"Talk Into the Machine," pp. 1-2. tele.com, The McGraw-Hill Companies, Inc. Jun. 3, 1996.

"Talk, Talk," pp. 1-7. tele.com, The McGraw-Hill Companies, Inc. Jun. 3, 1996.

* cited by examiner

INTERNET TELEPHONY ARRANGEMENT AND METHOD

RELATED PATENT DOCUMENTS

This application is a continuation of U.S. patent application Ser. No. 08/741,265 filed on Oct. 30, 1996, now U.S. Pat. No. 7,092,379, to which priority is claimed under 35 U.S.C. § 120.

FIELD OF THE INVENTION

The present invention relates generally to digital audio telecommunication, and more particularly, to a method and apparatus for audio communication via the Internet with a telephone circuit.

BACKGROUND OF THE INVENTION

With the fast growing popularity of the Internet and the World Wide Web (also known as "WWW" or the "Web"), a number of companies have been seeking to provide additional services over the Internet. As use of the Internet has increased, the price for access to the Internet has been significantly reduced. The inexpensive, flat-rate (or free) usage charges for the Internet have sparked interest in using the Internet for telephonic communication ("Internet telephony"). Such a system promises the ability to speak with anyone in the world connected to the Internet with no additional cost beyond the Internet access fee.

Current Internet communication systems are typically quite expensive. For example, a typical system employs a Windows 95™ operating system, a full duplex sound card, a microphone, a modem, at least 5 megabytes (MB) of disk storage space, 16 MB of random access memory, a Web browser and a central processing unit (CPU) capable of running the operating system and associated software. In addition to being expensive, such systems restrict the use of Internet communication to the desktop environment. Moreover, in order for a call to be completed, the receiver PC must be logged onto the Internet. Special protocols are used by such systems requiring protocol translating capability at each end of the call. These protocols are typically proprietary and must be purchased by both parties to the call.

Accordingly, there exists a need for an inexpensive and convenient apparatus and method for handling Internet audio communications which overcomes the aforementioned deficiencies in current systems.

SUMMARY OF THE INVENTION

The present invention overcomes the drawbacks associated with current telephone communication options and provides versatile, relatively low-cost telephonic communication.

One aspect of the present invention provides an arrangement which includes a telephone and an interface unit which interfaces the telephone to both a standard switched telephone communications network and an Internet communications network.

In accordance with a particular embodiment of the invention, the interface includes an input coupled to the telephone to receive audio information and two output ports configured to be respectively coupled to the standard switched telephone communications network and the Internet communications network. The interface further includes a processing unit which couples the audio information received from the telephone to the first output port in response to an indication that the telephonic communication is to be performed using the standard switched telephone communications network. The processing unit further processes the audio information received from the telephone in accordance with standard Internet transfer protocols and couples the processed audio information to the second output port in response to an indication that the telephonic communication is to be performed using the Internet communications network for transmission over the Internet using the standard Internet transfer protocols.

These and various other features and advantages of the invention are pointed out with particularity in the attached claims. However, for a better understanding of the invention, its advantages, and the objects obtained by its use, reference should be made to the drawings which form a further part hereof, and to accompanying descriptive matter, in which there is illustrated and described specific exemplary embodiments of a system in accordance with the invention.

BRIEF DESCRIPTION OF THE DRAWINGS

Other aspects and advantages of the present invention will become apparent upon reading the following detailed description and upon reference to the drawings in which.

Although the present invention has been described with reference to particular embodiments, the description is only an example of the invention's application and should not be taken as a limitation. Various adaptations and combinations of features of the embodiments disclosed are within the scope of the present invention as defined by the following claims.

DETAILED DESCRIPTION OF THE VARIOUS EMBODIMENTS

In accordance with an embodiment of the present invention, a single telephone device may be used as both a standard telephone which can be used to make phone calls over a normal telephone network and an Internet phone which can be used when calling someone over the Internet. Such a system overcomes problems associated with down time on the network. When the network is inoperable the interface may incorporate a switching function to automatically initiate a normal telephone call.

Figure 1:
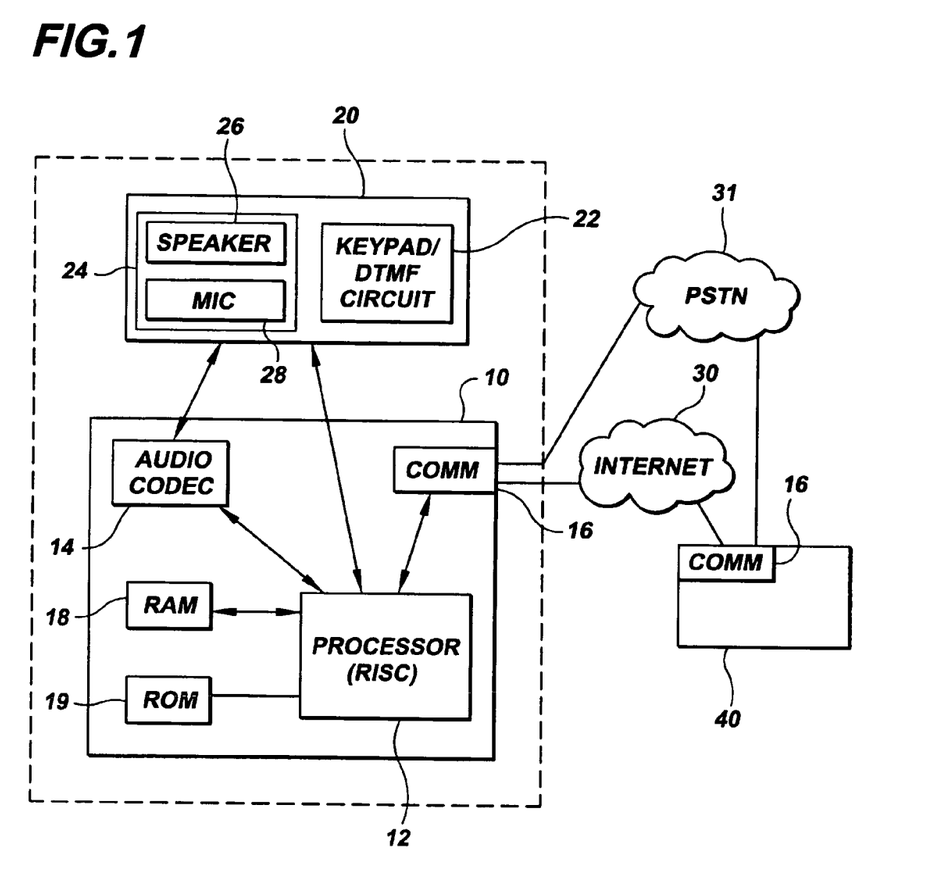
FIG. 1 is a block diagram illustrating an exemplary system in accordance with the principles of the present invention.
Figure 2A:
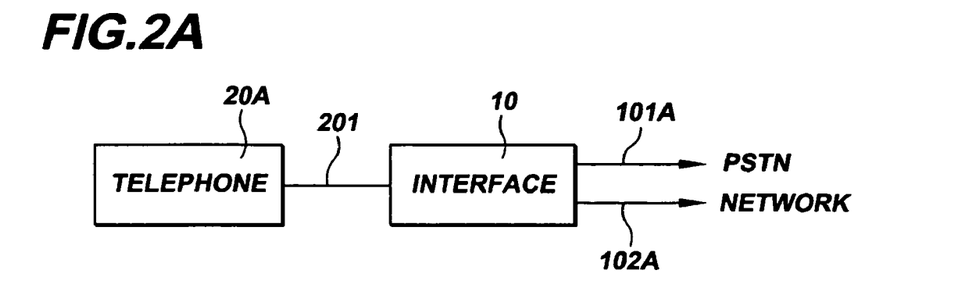
FIGS. 2A-2B illustrate various arrangements of an interface configured in accordance with the present invention.
Figure 2B:
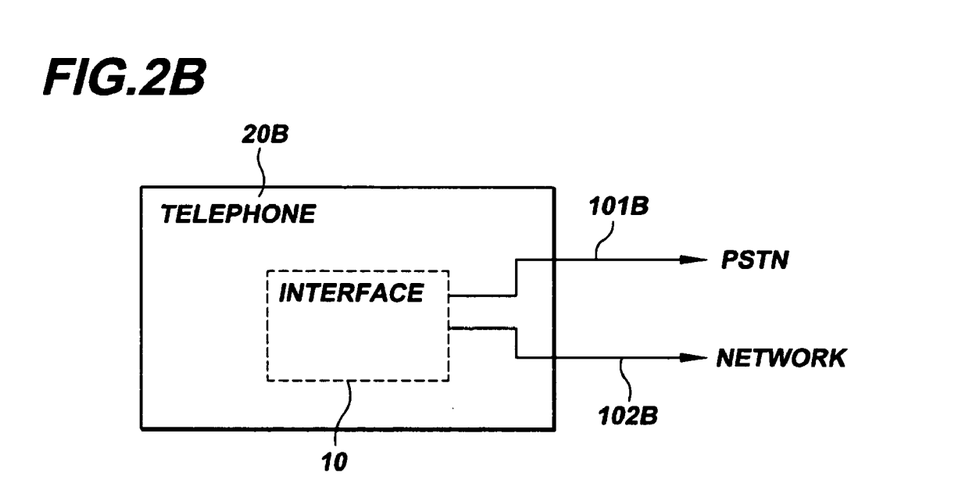

As illustrated in FIGS. 1 and 2A-2B, an interface 10 is used in connection with a telephone 20 to implement audio communication via the Internet. As will be more fully illustrated below, standard telephone circuitry is interfaced via the interface 10 to a standard telephone switched network such as a public switched telephone network (PSTN) for normal telephonic communication and to a communication network for Internet audio communication.

In FIG. 2A, the interface 10 is adapted for use with a conventional telephone 20A. More particularly, a conventional telephone 20A is coupled to the interface 10 via a standard telephone connection cable 201. The interface 10 is further provided with two output receptors. The first output 10A is coupled to a standard telephone network such as a PSTN using standard connection cables. The second output 102A from interface 10 provides a network connection, such as an ethernet port, for connection to a network coupled to the Internet. When connected for communication over the Internet, standard Internet protocols are used. In this manner, using an embodiment of the invention depicted in FIG. 2A, a conventional telephone can be readily and inexpensively modified for use as an Internet telephony device.

Alternatively, interface 10 may be integrated with a keypad/DTMF circuit 22 in a single telephony device, as illustrated in FIG. 2B. In FIG. 2B, an otherwise conventional telephone unit 20B is integrated with interface 10. The telephone unit has two output ports 101B and 102B for connection to a standard switched telephone network (e.g., PSTN) and to an Internet communications network (e.g., using an ethernet port), respectively. In either embodiment, the telephone 20 may have any desired features of conventional telephones such as a portable wireless handset. For example, in accordance with one embodiment of the invention an Internet telephone may be provided for the convenience of portability and is not limited to the traditional desktop environment.

The interface 10 may also be used to automatically select the type of phone call to be used. Each time a user is logged onto the Internet, the user is assigned an Internet protocol address (IP address) for that particular connection. The IP address is used to locate the user. In one embodiment of the invention, the interface 10 first recognizes the party which the caller wishes to reach ("the party to be called"). This is done, e.g., by inputting into the phone a code identifying the party to be called, or by programming the system to recognize the standard telephone number of the party to be called. When such a call is initiated, since the preferred low-cost connection is the Internet, the interface 10 searches a log of IP addresses to determine if the party to be called is logged onto the Internet. If so, the interface 10 establishes an Internet connection with the IP address of the party to be called, assuming the party to be called also has Internet telephone capability. If no IP address for the party to be called is located, then the phone call is initiated using the normal telephone network.

Returning to FIG. 1, the details of an exemplary interface 10 will be more fully described. Interface 10 includes a processor 12, such as a reduced instruction set computing (RISC) chip. The interface 10 also includes an audio coder-decoder (codec) 14 as well as memory which may include random access memory (RAM) 18 and read only memory (ROM) 19 for use by the processor 12. Audio codec 14 includes hardware along with supporting firmware and/or software and is included to provide an interface with the speaker 26 and microphone 28 of telephone 20. As will be described further hereinbelow, audio codec 14 provides analog-to-digital and digital-to-analog conversion of audio signals.

Communications circuitry 16 is provided in the interface 10 and includes hardware along with supporting firmware and/or software to provide an interface with a communication network coupled to the Internet 30 to provide a communication channel for Internet telephone communication using standard Internet protocols. The communication circuitry 16 also provides an interface to a normal telephone network such as a PSTN to provide normal telephone communication. The communication circuitry is coupled to the processor 12 which controls its operation.

Communication circuitry 16 provides the switching function between normal and Internet phone operations under control of the processor 12. The control operations of processor 12 are carried out pursuant to various firmware and/or software stored in its associated memory. The various components of the interface 10 may be advantageously implemented using a RISC processor based programmable communication chip, such as is illustrated and described in the commonly assigned copending application Ser. No. 08/457,516, entitled INTEGRATED MULTIMEDIA COMMUNICATION PROCESSOR AND CODEC, filed on May 31, 1995 (incorporated herein by reference).

Figure 3:
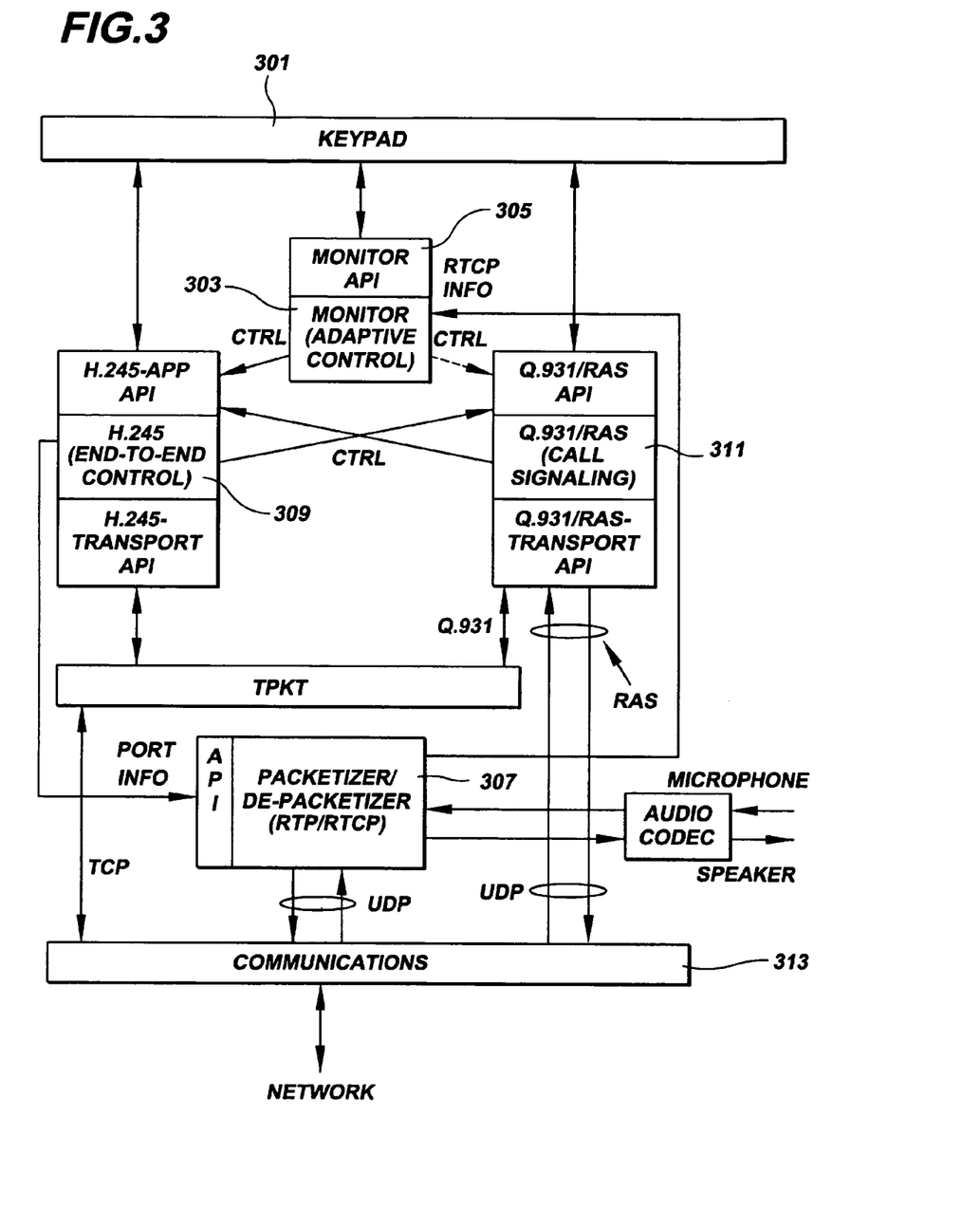
FIG. 3 is a block diagram illustrating the software components of the exemplary system.

FIG. 3 illustrates various software modules which can be used to implement an exemplary embodiment of the invention. In the illustrated exemplary embodiment, standard Internet transfer protocols are used. Use of the standard protocols eliminates the need to have proprietary protocol translators or special equipment at each end of an Internet call. Thus, the Internet communication device described herein, can be used with any of a variety of Internet communication devices which is designed to communicate over the Internet using the standard protocols.

For providing digital audio communications via the Internet, the software modules illustrated in FIG. 3 conform to International Telecommunication Union (ITU) standards set forth in ITU Recommendations H.323 entitled "Visual Telephone Systems and Equipment for Local Area Networks which Provide a Non-guaranteed Quality of Service", H.225.0 entitled "Media Stream Packetization and Synchronization on Non-Guaranteed Quality of Service LANs", H.245 entitled "Control Protocol for Multimedia Communication", and Q.931 entitled "Digital Subscriber Signaling System No. 1 (DSS 1)-ISDN User-Network Interface Layer 3 specification for Basic Call Control" (each incorporated herein by reference). Under control of the processor 12, the software modules may be loaded from a data storage device of the interface 10 for use during actual operations.

As illustrated in FIG. 3, the system receives input from the keypad 301. The information from the keypad 301 is coupled to an adaptive control monitor 303 via an application program interface (API) 305. The adaptive control Monitor 303 monitors information from the Real Time Transfer Control Protocol (RTCP) provided from the packetizer/de-packetizer 307. The RTCP information includes call statistics such as the number of packets which are lost in the transfer, how many packets are lost per second, the rate of loss, etc. Based on the RTCP information, the adaptive control monitor 305 controls the operation of the system. For example, the adaptive control monitor 305 may slow down selected audio streams or request that the other end slow its audio stream in order to obtain an acceptable audio transfer given the capability of the Internet to support such transfer at the particular moment.

The H.245 module 309 provides end-to-end control, in response to a call being initiated by providing information such as the type of audio transfer which can be supported by the system. The H.245 module opens a channel for audio transfer, informs the far end of what is going to be sent on the channel and receives confirmation from the far end that the audio information which is going to be sent is acceptable.

The Q.931/RAS module 311 provides signaling functions. The Q.931 part of module 311 provides call signaling. This occurs prior to the operation of the H.245 module 309. The Q.931 part of module 311 informs the system of the address of the person being called. The address is implemented using a predefined code, such as a phone number, or an IP address. The Q.931 module 311 sets up the initial handshake informing the system being called that a call is being initiated to that system. The system being called responds by refusing the call, replying with a busy signal, or providing other types of responses consistent with a telephone call.

The RAS part of module 311 performs gatekeeper signaling functions. RAS protocol is used as module 311 performs address translation and identifies the actual terminal the called party was using when the called party logged on so that the local router can determine where to send the call. The RAS module 311 also asks for bandwidth from a gatekeeper of the system which indicates if sufficient bandwidth exists to actually make the call. The functions of the RAS module 311 occur prior to the call handshake. For example, if the RAS determines that the call can be made and that there is an address for the call desired, the Q.931 functions of the Q.931/RAS module 311 are implemented followed by the H.245 module 309 operations.

The Packetizer/De-packetizer 307 performs standard packetizer operations. The RTP layer is a real-time transfer protocol which does a packetization on the audio information. Compressed audio is put into a packet suitable for the network. The RTP layer prepares the packets out of the audio streams and adds header information.

The Packetizer/De-packetizer 307 is interfaced to communications circuitry 313 which, in the case of Internet communication is coupled to the Internet via a network. The H.245 module 309 is coupled to the Packetizer/De-packetizer 307 to perform the necessary handshake operations and open up an audio channel, to send the audio data, to convey information about the receiver's port number where the RTP layer will send data, etc.

Figure 4:
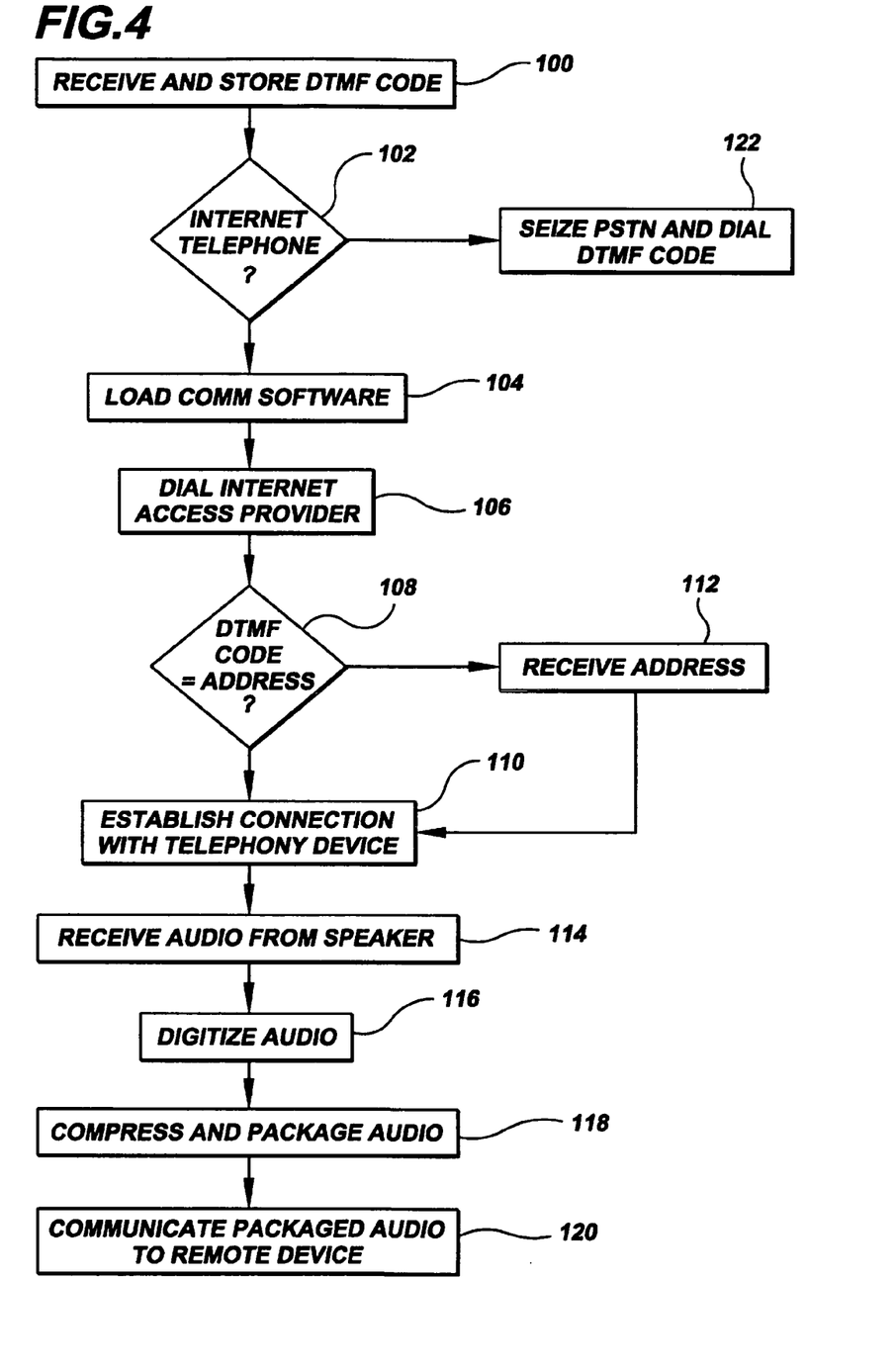
FIG. 4 is a flow chart illustrating a sequence of steps performed by an interface in accordance with the principles of the present invention.

FIG. 4 is a flowchart illustrating one manner in which interface 10 can be implemented according to the present invention. Block 100 represents interface 10 receiving a DTMF code from the keypad 22 of telephone 20. This step may further include the DTMF code being stored in the RAM memory 18 of interface 10.

Decision diamond 102 represents the interface 10 determining whether it received a DTMF code representing a request for audio communication via the Internet. In one embodiment, this step includes comparing the DTMF code to a variable stored in the RAM memory 18 of the interface. For example, a DTMF code, such as "*7", is recognized by interface 10 as a request for Internet audio communication. In an alternative embodiment, interface 10 recognizes as an Internet audio request a DTMF code representing the number for a local Internet access provider. In yet another alternative embodiment, the DTMF code is a phone number which matches one phone number from a list of phone numbers stored in memory for individuals having Internet phones. In one application, when this is identified, the system determines if an IP address is available for the person associated with the phone number (DTMF code) and then directs the call over either the Internet or standard phone networks accordingly.

As is appreciated by those in the art, the Internet telephony device being called 40 may be any system or device operating with Internet telephony software compatible with interface 10. For example, Internet telephony device being called 40 may be a personal computer or another arrangement including interface 10.

As described above, if the DTMF code does not represent a request for Internet audio communication, control moves to block 122 where the interface 10 seizes, for example, the PSTN line and dials the telephone number associated with the received DTMF code at block 100.

When an Internet call is to be initiated, as indicated by block 104, interface 10 loads the various software modules, for example, as depicted in FIG. 3, into RAM memory 18. Following block 104, interface 10 seizes the communications network or PSTN line and dials the number for the local Internet access provider. The telephone number of the access provider may be stored in and retrieved from memory 18.

Next, interface 10 determines if the DTMF code represents the address, e.g., an IP address, of an Internet telephony device 40, as indicated by decision diamond 108. If so, interface 10 establishes a connection with the telephony device. Otherwise, interface 10 receives a DTMF code representing an address of an Internet telephony device, as indicated at block 112, and then proceeds to establish a connection with this telephony device. In typical applications, the connection is established in accordance with protocols well-known in the art, for example, ISDN, TCP/IP, and H-323 protocols and as described in connection with FIG. 3.

Interface 10 then waits for audio signals from the microphone of the telephone handset 24. Block 114 represents interface 10 receiving audio signals from the microphone.

The audio signals are converted from analog signals to digital audio signals using audio codec 14, as indicated at block 116. The digital audio signals are then compressed and packaged with the software modules, as indicated at block 118. Finally, the packaged audio signals are communicated to the Internet telephony device 40 as indicated at block 120. In a particular embodiment, this step includes synchronizing the communicated data using the various software modules and communications components 16 of the telephony device 40 and interface 10, applying standard techniques known in the art.

Figure 5:
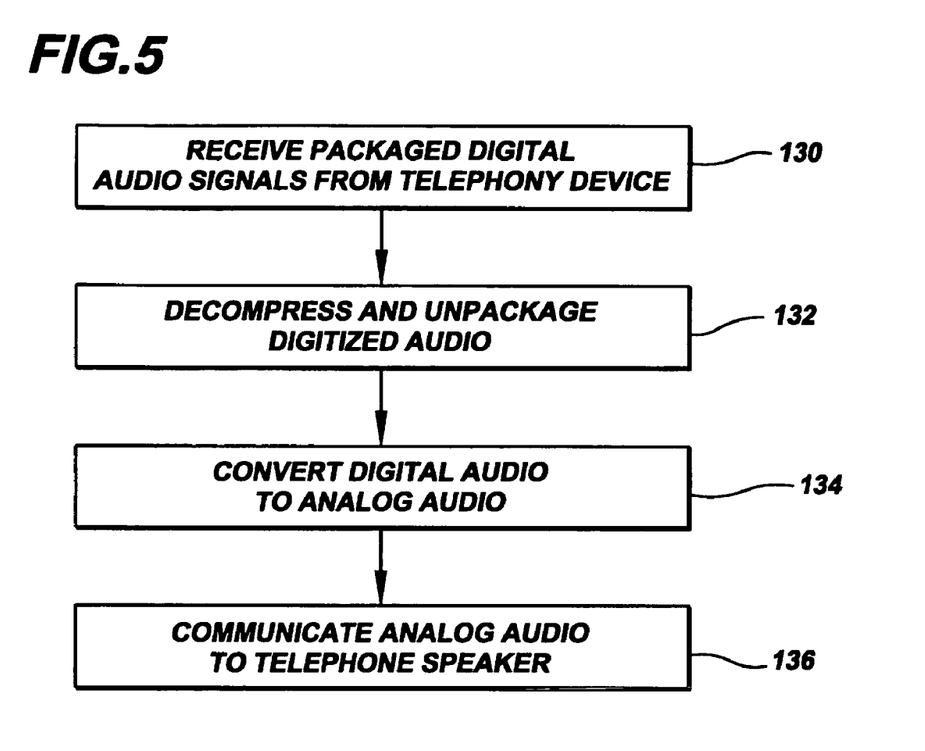
FIG. 5 is a flow chart illustrating the steps performed by the interface of FIG. 4 in receiving communication from another Internet telephony device.

FIG. 5 is a flowchart illustrating a sequence of steps performed by interface 10, in accordance with one embodiment of the present invention, in receiving audio communication from Internet telephony device 40. Block 130 represents the communications component 16 receiving packaged digital audio signals from the telephony device 40. The packaged digital signals are then decompressed if necessary and unpackaged using the software modules, as indicated at block 132. As indicated at blocks 134 and 136, the digital audio signals are then converted to analog audio signals and communicated to the speaker 26 of telephone 20 for output thereby.

The foregoing description of embodiments of the present invention has been presented for the purposes of illustration and description. It is not intended to be exhaustive or to limit the invention to the precise form disclosed. Modifications and variations are possible in light of the above teaching. It is intended that the scope of the invention not be limited by this detailed description, but rather extend to cover the full and fair scope of the claims set forth below.

What is claimed is:

1. An interface arrangement for providing telephonic communication between a calling party and another party, the interface arrangement comprising:
   first means, including a first output port, for coupling to a standard switched telephone communications network;
   second means, including a second output port, for coupling to an internet communications network; and
   processing means for:

receiving from the calling party a telephone number designating a telephonic communications addressee;

communicating with an internet appliance to determine whether the telephonic communications addressee is accessible via internet protocol telephonic communications as a function of internet connectivity status of the telephonic communications addressee;

in response to determining that the telephonic communications addressee is not accessible via internet protocol telephonic communications, telephonically connecting audio information from the calling party to the other party via the first output port to establish standard telephonic communications between the calling party and the other party using the standard switched telephone communications network; and in response to determining that the telephone number is accessible via internet protocol telephonic communications, telephonically connecting audio information from the calling party to the other party via the second output port to establish internet telephonic communications between the calling party and the other party using the internet communications network.

2. The interface arrangement of claim 1, wherein the processing means is configured and arranged to communicate with an internet appliance to determine whether the telephonic communications addressee is accessible via internet protocol telephonic communications as a function of internet connectivity status of the telephonic communications addressee by determining whether an internet protocol telephone call made to the communications addressee is connected.

3. The interface arrangement of claim 1, wherein the processing means is configured and arranged to connect audio information from the calling party to the other party via the first output port to establish standard telephonic communications between the calling party and the other party using the standard switched telephone communications network in response to an internet connection previously available to the interface arrangement being disabled.

4. An interface arrangement for providing telephonic communication between a calling party and another party, the interface arrangement comprising:

an audio communications circuit that is coupled to a standard switched telephone communications network and an Internet communications network; and a telephony processor circuit to receive from the calling party a telephone number designating a telephonic communications addressee;

determine whether the telephonic communications addressee is accessible via Internet protocol telephonic communications as a function of Internet connectivity status of the telephonic communications addressee; and in response, telephonically connect audio information from the calling party to the other party via the standard switched telephone communications network or the Internet communications network, thru the audio communications circuit.

5. The interface arrangement of claim 4, wherein the telephony processor circuit is configured and arranged to telephonically connect audio information from the calling party to the other party via the Internet communications network using standard Internet transfer protocols.

6. The interface arrangement of claim 5, wherein the standard Internet transfer protocols include a standard packetization protocol to packetize a stream of audio information.

7. The interface arrangement of claim 6, wherein the standard packetization protocol uses a standard real-time transfer protocol.

8. The interface arrangement of claim 4, wherein the telephony processor circuit is configured and arranged to determine whether the telephonic communications addressee is accessible via Internet protocol telephonic communications as a function of Internet connectivity status of the telephonic communications addressee by searching a log of IP addresses to determine if the telephonic communications addressee is logged on to the Internet.

9. The interface arrangement of claim 4, wherein the telephony processor circuit is configured and arranged to telephonically connect audio information from the calling party to the other party via the standard switched telephone communications network in response to an Internet connection, that was previously being used to telephonically connect audio information from the calling party to the other party via the Internet communications network, being disabled.

10. For an interface arrangement that provides telephonic communication between a calling party and another party and that has an audio communications circuit which is coupled to a standard switched telephone communications network and an Internet communications network, a telephony arrangement comprising:

a telephony processor circuit to receive from the calling party a telephone number designating a telephonic communications addressee;

determine whether the telephonic communications addressee is accessible via Internet protocol telephonic communications as a function of Internet connectivity status of the telephonic communications addressee; and in response, telephonically connect audio information from the calling party to the other party via the standard switched telephone communications network or the Internet communications network, thru the audio communications circuit.

11. The telephony arrangement of claim 10, wherein the telephony processor circuit is configured and arranged to telephonically connect audio information from the calling party to the other party via the Internet communications network using standard Internet transfer protocols.

12. The telephony arrangement of claim 11, wherein the standard Internet transfer protocols include a standard packetization protocol to packetize a stream of audio information.

13. The telephony arrangement of claim 12, wherein the standard packetization protocol uses a standard real-time transfer protocol.

14. The telephony arrangement of claim 10, wherein the telephony processor circuit is configured and arranged to determine whether the telephonic communications addressee is accessible via Internet protocol telephonic communications as a function of Internet connectivity status of the telephonic communications addressee by searching a log of IP addresses to determine if the telephonic communications addressee is logged on to the Internet.

15. The telephony arrangement of claim 10, wherein the telephony processor circuit is configured and arranged to telephonically connect audio information from the calling party to the other party via the standard switched telephone communications network in response to an Internet connection, that was previously being used to telephonically connect audio information from the calling party to the other party via the Internet communications network, being disabled.

16. An arrangement for providing telephonic communication between a calling party and another party, the arrangement comprising:

a telephone; and an interface unit coupled to the telephone and configured and arranged to receive audio information designating a telephonic communications addressee from the calling party via the telephone, the interface unit including a first output port configured to be coupled to an Internet communications network, and a processing unit configured and arranged to determine whether the telephonic communications addressee is accessible via Internet protocol telephonic communications as a function of Internet connectivity status of the telephonic communications addressee, to process the audio information in accordance with standard Internet transfer protocols, and to telephonically connect the processed audio information from the calling party to the other party using the Internet communications network in accordance with the standard Internet transfer protocols.

17. The arrangement of claim 16, wherein the interface unit is part of the telephone.

18. The arrangement of claim 16, wherein the interface unit further includes a second output port configured to be coupled to a standard switched telephone communications network, and wherein the processing unit is further configured and arranged to telephonically connect the audio information from the calling party to the other party using the standard switched telephone communications network via the second output port in response to determining that the telephonic communications addressee is inaccessible via Internet protocol telephonic communications.

19. The arrangement of claim 16, wherein the standard Internet transfer protocols include a standard packetization protocol to packetize a stream of the audio information.

20. The arrangement of claim 19, wherein the standard packetization protocol uses a standard real-time transfer protocol.

* * * * *